United States Patent [19]
Dean

[11] 4,023,513
[45] May 17, 1977

[54] METHOD AND APPARATUS FOR TRANSFERRING CANS

[75] Inventor: Geoffrey J. Dean, Lakewood, Colo.

[73] Assignee: Ball Corporation, Muncie, Ind.

[22] Filed: Aug. 18, 1975

[21] Appl. No.: 605,683

[52] U.S. Cl. .............................. 113/115; 198/479
[51] Int. Cl.² ................. B21D 43/00; B65G 29/00
[58] Field of Search ............ 113/7 R, 115; 198/25, 198/210; 10/169

[56] References Cited

UNITED STATES PATENTS

| | | | |
|---|---|---|---|
| 2,112,119 | 3/1938 | Rowe | 198/210 X |
| 2,405,367 | 8/1946 | Nichols, Jr. | 10/169 |
| 3,618,743 | 11/1971 | Benator | 198/210 X |
| 3,802,363 | 4/1974 | Langewis | 113/115 X |

*Primary Examiner*—Leon Gilden
*Attorney, Agent, or Firm*—Gilbert E. Alberding; Thomas W. O'Rourke

[57] ABSTRACT

Method and apparatus for transferring cylindrical articles in a synchronous manner from a forming ram to a work station for further forming of the articles, the transfer being accomplished by interposing between the forming ram and work station a constantly rotating wheel structure having a plurality of pockets defined therein, each of the pockets being formed of at least two independently programmable and movable sections, the wheel and pockets therein being positioned with the axis of wheel structure parallel to the forming ram with the pockets arranged in a circular configuration which substantially coincides at at least one position with the axis of the ram with a pocket adjacent the ram upon each extension of the ram, displacing newly formed articles axially from the ram into a pocket adjacent thereto with the sections of the pocket in an open configuration, initiating closing of the leading pocket section prior to closing of the trailing pocket section and after the leading pocket section passes the ram, accurately positioning the article in the closed pocket, and carrying the article to a work station such as a trimmer, the wheel structure, work station and forming ram all being interconnected to operate synchronously.

7 Claims, 8 Drawing Figures

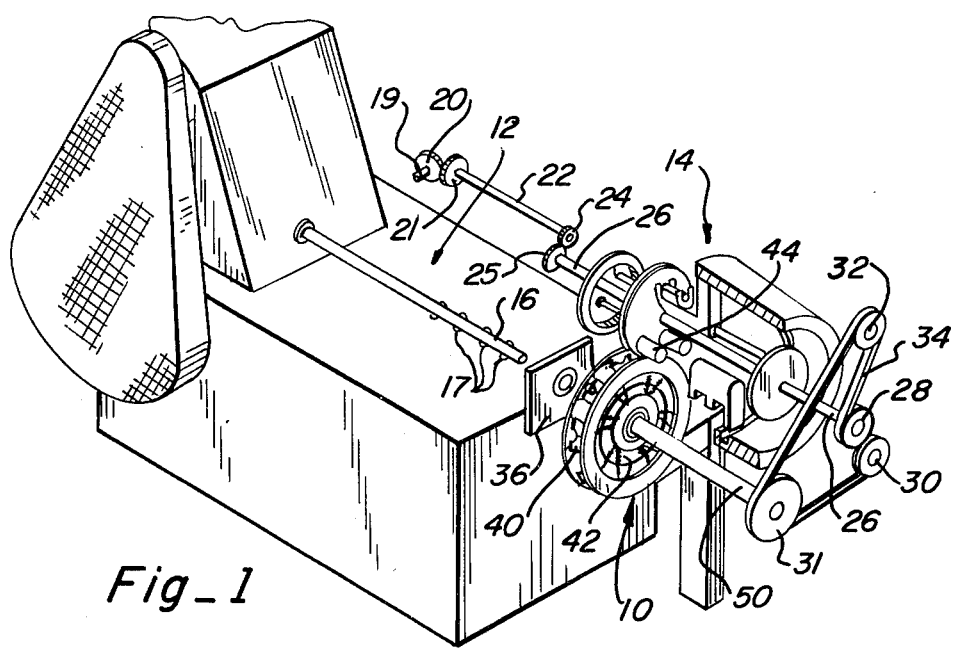
Fig_1
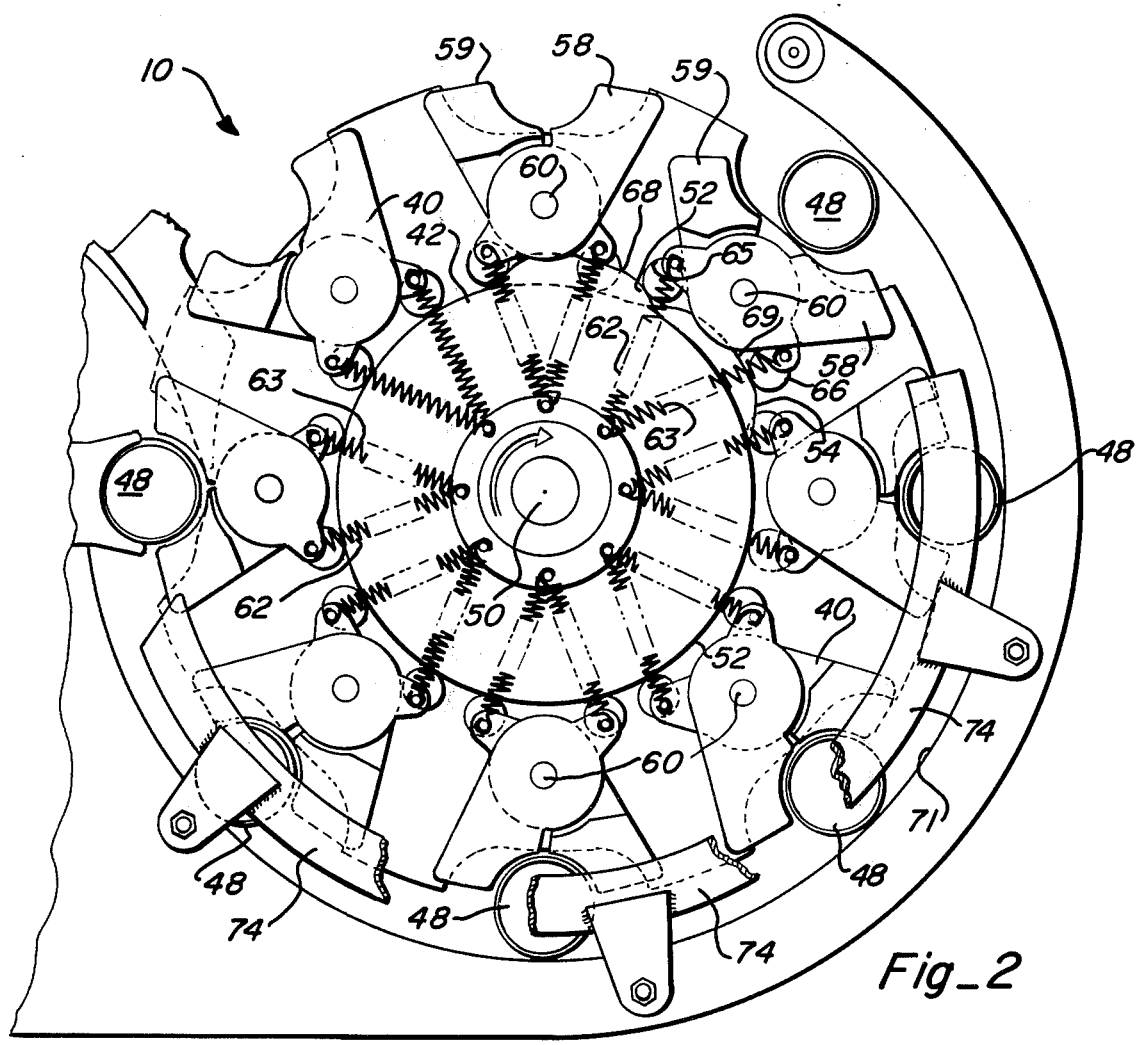
Fig_2

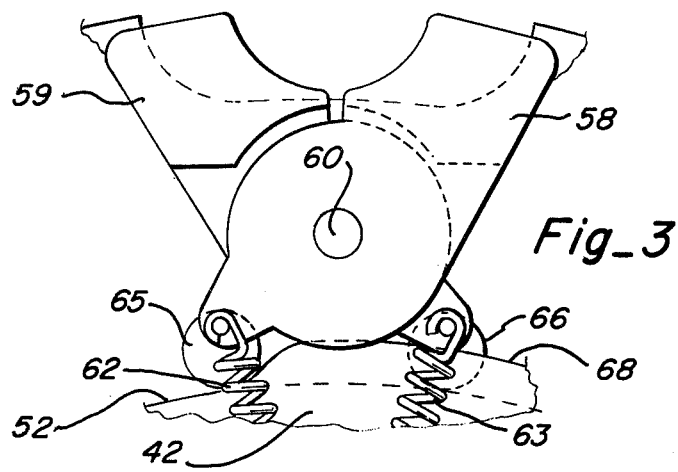
Fig_3
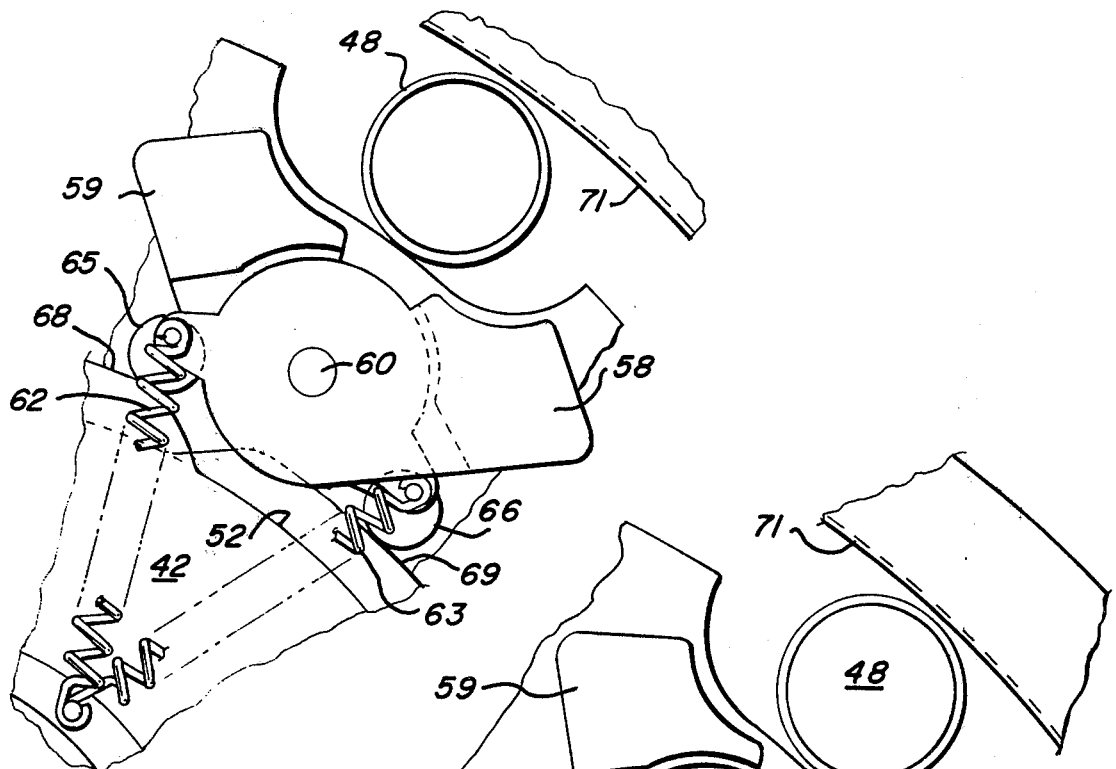
Fig_4
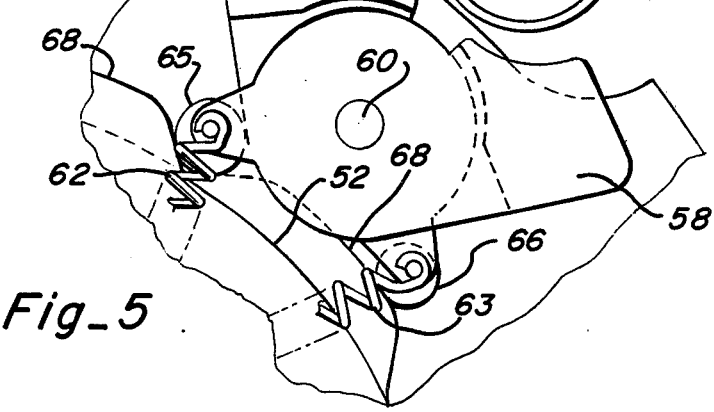
Fig_5

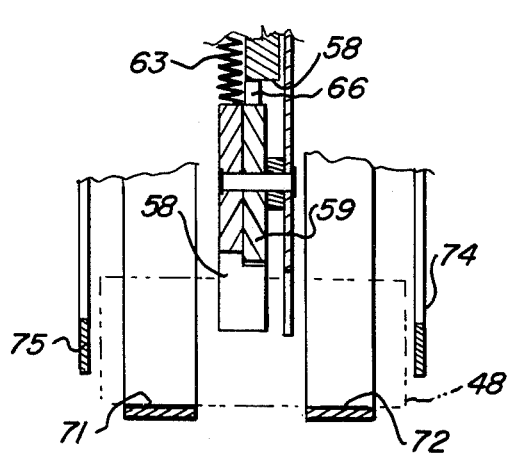
Fig_7
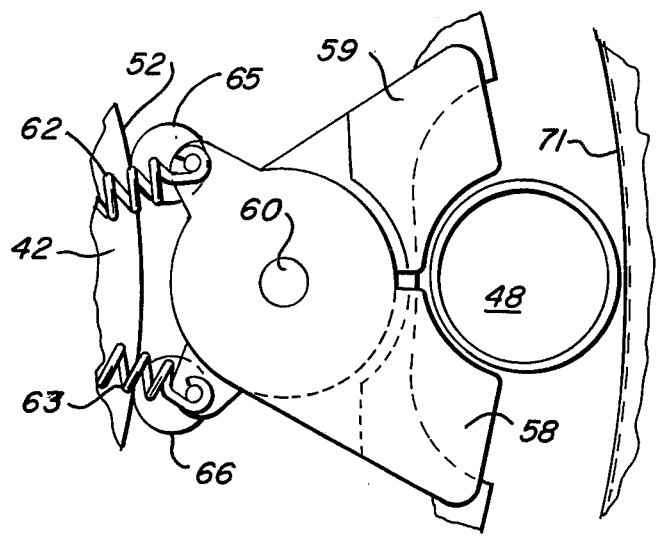
Fig_6
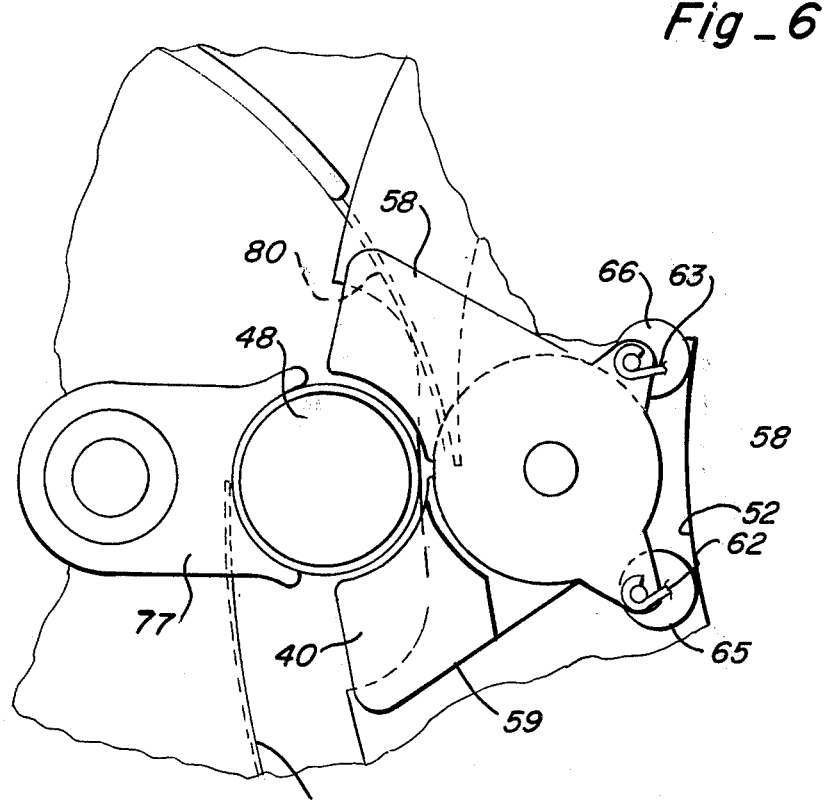
Fig_8

METHOD AND APPARATUS FOR TRANSFERRING CANS

BACKGROUND OF THE INVENTION

1. Field of the Invention

The present invention relates generally to transfer mechanisms and methods for cylindrical articles, and more particularly to a synchronized transfer mechanism for moving newly formed cans from a forming ram to a work station, such as a trimmer.

2. Description of the Prior Art

Production of thin wall drawn and ironed metal cans involves drawing of a cup of the metal, which may be, for instance, steel or aluminum, into an elongated can configuration and then ironing by means of dies to produce very thin walls. As a result of this process, the upper portion of the can is open and of uneven length while the bottom portion of the can is closed with an integral bottom. The uneven upper portion must be trimmed to produce a can body of uniform height prior to further processing steps.

As a rule, the cans are ejected axially from the ram by, for instance, air pressure and/or stripper fingers and fed into a chute. The chute serves as an accumulation volume and the trimmer is conventionally operated in nonsynchronous fashion. However, since the walls of the can are thin and fragile, and since the height of the can varies, the newly formed cans are difficult to transport with chute arrangements. An example of a chute or hopper feed is shown in Gladfelter et al, U.S. Pat. No. 2,298,366 and Windstrup, U.S. Pat. No. 3,548,769. Once the can is presented to the processing station in, for instance, an in-feed chute, it is often necessary to synchronize the feed of the cans with the work station such as by the screw feed shown in Cvacho et al, U.S. Pat. No. 3,756,103.

Thus, the prior art generally accumulated the newly formed cans in chutes or hoppers and provided the work station with an independent, unsynchronize supply which had to be resynchronized with the machine. The shortcomings and drawbacks of this approach was recognized in Langewis, U.S. Pat. No. 3,864,995. Instead of utilizing an accumulation area between the can forming machine and work station, this more recent teaching utilized an indexing star-wheel conveyor which stops in a position aligned with the end of the forming ram, receives a newly formed can, and rapidly accelerates the can into a work station. However, at the high line speeds involved, the indexing of the star-wheel involves substantial acceleration and requires a relatively complex drive to synchronize the stopping and starting star-wheel with the motion of the forming ram.

While not entirely appropriate for the purposes of the instant invention, Spain, U.S. Pat. No. 828,865 discloses a feed mechanism in which articles are dropped radially into a vertical wheel mechanism in which a full circle enclosure opens and closes symmetrically to receive the falling articles.

SUMMARY OF THE INVENTION

The present invention, which provides a heretofore unavailable improvement over previous synchronized feed mechanisms and methods, comprises a continuously rotating wheel structure having defined therein a plurality of pockets which, during a portion of the wheel structure movement, are aligned with and adjacent to the body forming ram. The pockets are formed of movable sections which may be opened and closed independently of each other. Further, the pockets are synchronized with the ejection of the newly formed can from the ram whereby the leading edge of the pocket initiates closing preferably as soon as it passes the volume occupied by the can as it enters the pocket. Thus the relative movement between the rotating pocket and newly inserted can is minimized as the leading edge of the pocket moves towards the can and largely counters the rotational movement of the wheel. Thereafter, the trailing edge of the pocket closes around the can to accurately locate the can in the pocket. The constantly rotating wheel is driven in synchronous with the ram to, at one position, present an open pocket for each can ejected from the ram and, at another position, to provide a can to a work station such as a trimmer.

Accordingly, an object of the present invention is to provide a new and improved method and apparatus for synchronously feeding cans from a can body maker to a work station.

Another object of the present invention is to provide a new and improved method and apparatus for axially feeding cans into a constantly rotating wheel structure by means of movable sections forming pockets in the wheel structure.

Yet another object of the present invention is to provide a new and improved method and apparatus for transferring cans which has a fail-safe positive displacement of the pocket sections in the critical interface with the forming ram.

Still another object of the present invention is to provide a new and improved method and apparatus for processing cans in which a can former, a can trimmer and an interfacing transfer means are commonly driven in a constant and synchronous manner.

These and other objects and features of the present invention will become apparent from the following description.

BRIEF DESCRIPTION OF THE DRAWING

In the drawing

FIG. 1 is a simplified perspective view of a transfer apparatus, in accord with the present invention, with a body maker and work station.

FIG. 2 is a more detailed axial view of the transfer apparatus shown in FIG. 1.

FIG. 3 is an enlarged partial view of a pocket portion of the instant invention in a closed figuration;

FIG. 4 is an enlarged partial view of an open pocket portion of the apparatus in accord with the instant invention configured to receive a newly formed can;

FIG. 5 is an enlarged partial view of a pocket portion of an apparatus in accord with the present invention upon initially receiving a can in the pocket;

FIG. 6 is an enlarged partial view of a pocket portion of an apparatus in accord with the present invention which is transporting a can in a fully closed configuration;

FIG. 7 is a sectioned view of a pocket; and

FIG. 8 is an enlarged, partial view of the transfer mechanism in accord with the instant invention wherein a can is being transferred to a work station.

DETAILED DESCRIPTION OF THE INVENTION

Turning now to the drawings, wherein like components are designated by like reference numerals throughout the various figures, a transfer device for synchronously conveying cans between a can body maker and a work station is illustrated in FIG. 1 and generally designated by reference numeral 10. In conjunction with transfer mechanism 10, body maker 12 and work station 14, form an integrated, synchronized combination for forming and processing cans. Ram 16, driven by the prime mover (not shown) of body maker 12, is forced through forming dies 17 to produce a can body having an upper portion of uneven length. Power take-off 19 from body maker 12 and associated bevel gears 20 and 21 drive shaft 22 which in turn, through reduction gears 24 and 25, drive main shaft 26 of work station 14. At the other end of main shaft 26, drive wheel 28, driven wheel 31 for transfer mechanism 10, and idler wheels 30 and 32 form, in conjunction with belt 34, a serpentine drive which, as shown, causes drive wheel 28 and driven wheel 31 to rotate in opposite directions. In this manner, work station 14 is driven by means of reduction gears 24 ultimately driven by power take-off 19 as a direct mechanical linkage to body maker 12. Preferably, the drive means between body maker 12 and work station 14 reduces the drive speed as a function of the number of individual stations in work station 14 relative to the number of articles formed by body maker 12 per revolution of power take-off 19. Similarly, the ratio of speeds between transfer mechanism 10 and work station 14 is controlled by the relative sizes of drive wheel 28 and driven wheel 30, and are again a ratio of the number of stations in transfer means 10 relative to the number of stations in work station 14.

In operation, a can 48, shown in FIG. 2, is formed by the movement of ram 16 through forming dies 17 in a conventional manner and removed from ram 16 by stripper means 36 while a pocket 40 of transfer means 10 is adjacent the end of ram 16 as a result of the synchronous continuous movement of transfer means 10 as will be described in more detail below. Also, as a result of the synchronous, serpentine drive of transfer means 10 and work station 14, a pocket 40 interfaces with a station routine. At all times, transfer mechanism 10, body maker 12 and work station 14 are driven in a continuous and synchronous manner by fixed ratio, positively interlocked drive means.

The manner in which a continuously driven wheel structure 42 having a plurality of pockets 40 defined therein operates to receive an axially delivered can 48 will be more readily understood with reference to FIGS. 2 through 7. For purposes of clarity and to illustrate various modes of operation, the wheel structure 42 illustrated in FIG. 2 rotates in a counter-clockwise direction as viewed while that illustrated in FIG. 1 operates in a clockwise direction. Further, the position of transfer between transfer mechanism 10 and work station 14 in FIG. 1 has been altered somewhat for purposes of this illustration. As shown in FIG. 2, wheel structure 42 is supported for rotation on concentric shaft 50. A plurality of movable pockets 40 are supported on wheel structure 42. More particularly, pockets 40 are formed of first articulated section 58 and second articulated section 59 joined together by central pivot 60. Each pocket 40 is normally biased into a closed position by means of spring members 62 and 63 attached to first section 58 and second section 59 respectively.

Each of the articulated sections 58 and 59 carry a roller cam follower 65 and 66 respectively. Thus, while spring members 62 and 63 normally urge articulated sections 58 and 59 into a closed configuration, lobes 68 and 69 of cam surfaces 52 and 54 displace cam followers 65 and 66 to open sections 58 and 59 at preselected portions to positively open pocket 40 to receive can 48. Even in the event spring members 62 and 63 fail, sections 58 and 59 of pocket 40 will be open to receive a can 48 from ram 16.

Thus as shown in FIG. 3, springs 65 and 66 normally maintain first and second movable sections 58 and 59 of pocket 40 in a closed position with cam followers 65 and 66 riding on cam surfaces 52 and 54 respectively. However, as shown in FIG. 4, as first and second movable sections 58 and 59 approach the position at which can 48 is ejected into pocket 40, roller cam followers 65 and 66 ride up raised lobes 68 and 69 of cam surfaces 52 and 54 thereby opening movable sections 58 and 59 to receive can 48. Open pocket 40 more than adequately provides room for can 48 to enter pocket 40 while pocket 40 moves with wheel structure 42. As first movable section 58 passes the point of interference with can 48, as shown in FIG. 5, roller cam follower 65 descends the ramp portion of lobe 68 thereby initiating the closing of first movable section 58 independent of the movement of second movable section 59 which is maintained in the open configuration by cam follower 66 on lobe 69. Thus, with first movable section 58 closing, the relative movement between can 48 and first movable section 58 is minimized. When, as shown in FIG. 6, can 48 is fully within pocket 40, both first and second movable sections 58 and 59 are completely closed as a result of both roller cam followers 65 and 66 beig supported by cam surfaces 52 and 54 at other than the location of raised lobes 68 and 69. Can 48 is firmly held within closed pocket 40 and guiderails 71 and 72 and end plates 74 and 75 for transport, as shown in FIG. 7, with rotation of wheel structure 42.

At the point of transfer between transfer mechanism 10 and work station 14, pocket 40 comes into register with receiving means 77 of work station 14. Both pocket 40 and receiving means 77 constitute essentially a half circle (or somewhat less) support of can 48. Guiderail 80 serves to move can 48 out of pocket 40 as both transfer means 10 and work station 14 rotate in synchronous as described with reference to FIG. 1. Thus, can 48 is delivered in a positive, synchronous manner from body maker 12 through transfer means 10 to work station 14. At all times, as a result of the interlocking of the three mechanisms, the can is transferred in a synchronous manner.

Once deposited at receiving means 77 and secured between receiving means 77 and guiderail 80, can 48 is further processed in accord with the prior art, or any other desired manner. As described above, transfer from body maker 12 to work station 14 is accomplished without resort to accumulation hoppers and without loss of synchronization. Further, the transfer is accomplished using constantly rotating wheel structure 42.

Although but one embodiment of the present invention has been illustrated and described, it is anticipated that numerous changes and modifications will be apparent to those skilled in the art and that such changes may be made without departing from the invention, as defined by the following claims.

What is claimed is:

1. In combination with an individual article producing apparatus including a longitudinally reciprocating ram and dies associated with the ram for producing articles, and a work station for processing such articles, a transfer mechanism for synchronously moving cylindrical articles from the ram to the work station, the transfer mechanism comprising:

a wheel structure mounted for rotation around an axis parallel to the axis of the ram, a plurality of substantially equally spaced pockets carried on the periphery of the wheel structure at a radius of the wheel structure substantially corresponding to the displacement between the axis of the wheel structure and the axis of the ram, the pockets being comprised of leading and following mutually articulated, independently movable sections and being in the form of an opening facing away from the axis of the wheel structure and extending less than 180° around the center of the opening, cam followers connected to each of the sections and a fixed substantially circular cam for each cam follower concentric with the wheel structure positioned to receive the cam follower and having a raised lobe portion for initiating movement of the leading section towards a closed configuration as the leading section passes the ram but prior to movement of the second section to the closed position, guide means concentric with the wheel structure but spaced therefrom positioned between the ram and the work station, means for removing an article from a pocket at the work station, and means for synchronously and continuously moving the wheel structure, the forming ram and the work station, whereby articles formed on the ram may be ejected from the extended ram into an open pocket adjacent the end of the ram while the wheel structure is continuously rotating, the article initially being positioned by the closing of the leading section of the pocket and thereafter accurately contained within the pocket by the closed sections of the pocket and the guide means for transport to and transfer to the work station.

2. A mechanism as set forth in claim 1 in which a spring is attached between the wheel structure and each section of the pocket to bias the pocket sections into a closed position, the springs being subject to distending when the cam followers are on the raised lobe portion to open the sections.

3. A mechanism as set forth in claim 2 in which the means for removing an article at the work station comprise an arm mounted for rotation around an axis substantially parallel to the wheel structure axis but spaced therefrom, the arm having defined in the end portion thereof a detent adopted to engage a pocket defined in the wheel structure upon rotation of the wheel structure and the arm, means to synchronously move the arm to abut a pocket in the wheel structure, rails concentric with the wheels structure and spaced radially therefrom extending between the ram interface with the wheel structure and the work station interface with wheel structure adjacent the position at which the detent abuts a pocket, and additional guide means concentric with the axis of rotation of the arm but spaced radially from the arm the additional guide means extending substantially on one side of a plane through the axis of rotation of the wheel structure and also through the axis of rotation of the arm, and the rails extending substantially on the other side of such plane.

4. A mechanism as set forth in claim 3 in which parallel, arcuate end plates are provided adjacent the path of the wheel structure between the location of the ram adjacent the wheel structure and the location of the abutment of the detent and the pocket at the work station.

5. A method of transferring articles from an article maker comprising:

forming an article on an axially reciprocating ram, continuously rotating a plurality of pockets having independently movable leading and trailing sections in a circular path past the end of the ram, opening a pocket defining an opening extending less than 180° around the center thereof in synchronous with the ram as the pocket approaches the end portion of the ram, ejecting an article from the end of the ram into an adjacent open pocket, initiating closing of the leading section of the pocket immediately upon that section passing the end of the ram, thereafter closing both sections of the pocket as the pocket passes the ram, confining the article between the pocket and an adjacent guide means concentric to the path of travel of the pocket, transporting the confined article in the closed pocket, removing the article from the closed pocket at rotating work station means operating in synchronous with the rotating pockets, and reopening the pocket for insertion of another article therein as the pocket again passes the end of the ram.

6. A method as set forth in claim 5 in which the work station means includes a plurality of article engaging means, and the ratio of angular velocities of the pockets and the work station article engaging means is proportional to the number of work station article engaging means relative to the number of pockets.

7. A method as set forth in claim 5 in which the ram is reciprocated towards and away from the pockets and the article is ejected from the end of the ram when the ram is physically within the open pocket.

* * * * *